(12) United States Patent
Giles et al.

(10) Patent No.: US 11,071,940 B2
(45) Date of Patent: Jul. 27, 2021

(54) FLOW BALANCE CONTROL IN VOLATILE ORGANIC COMPOUND (VOC) ABATEMENT SYSTEMS

(71) Applicant: Munters Corporation, Selma, TX (US)

(72) Inventors: Frank Giles, Kingston, NH (US); Edwin John Lamport, North Billerica, MA (US)

(73) Assignee: Munters Corporation, Selma, TX (US)

( * ) Notice: Subject to any disclaimer, the term of this patent is extended or adjusted under 35 U.S.C. 154(b) by 620 days.

(21) Appl. No.: 15/833,932

(22) Filed: Dec. 6, 2017

(65) Prior Publication Data

US 2018/0154303 A1 Jun. 7, 2018

Related U.S. Application Data

(63) Continuation of application No. 62/430,824, filed on Dec. 6, 2016.

(51) Int. Cl.
*B01D 53/06* (2006.01)
*B01D 53/34* (2006.01)
(Continued)

(52) U.S. Cl.
CPC ......... *B01D 53/06* (2013.01); *B01D 53/0454* (2013.01); *B01D 53/346* (2013.01); *B01J 20/18* (2013.01); *B01J 20/3408* (2013.01); *B01J 20/3483* (2013.01); *B01D 53/44* (2013.01); *B01D 2253/108* (2013.01); *B01D 2257/708* (2013.01); *B01D 2258/0216* (2013.01); *B01D 2258/0258* (2013.01); *B01D 2259/401* (2013.01); *B01D 2259/402* (2013.01);
(Continued)

(58) Field of Classification Search
CPC .... B01J 20/18; B01J 20/3483; B01J 20/3408; B01D 2259/4009; B01D 2258/0258; B01D 2259/41; B01D 53/346; B01D 53/06; B01D 2257/708; B01D 53/44; B01D 2258/0216; B01D 53/0454; B01D 2253/108; B01D 2259/401; B01D 2259/402; F04D 27/004
See application file for complete search history.

(56) References Cited

U.S. PATENT DOCUMENTS 5,814,132 A 9/1998 Grime et al.
5,871,347 A 2/1999 Chen et al.
(Continued)

OTHER PUBLICATIONS

"Zeolite Rotor Concentrators," Munters Corporation—Zeol Division, 2003, 5 pages.
(Continued)

*Primary Examiner* — Shogo Sasaki
(74) *Attorney, Agent, or Firm* — Venable LLP

(57) ABSTRACT

A method of controlling an apparatus that removes specified substances from a process gaseous stream can control at least one fan and a rotary wheel that removes the specified substances. The method includes measuring a pressure difference of the process gaseous stream across upstream and downstream sides of the rotary wheel, comparing the measured pressure difference to a predetermined pressure range, and controlling the at least one fan to increase or decrease its speed if the measured pressure difference is outside of the predetermined pressure range so as to change the pressure difference so as to be within the predetermined pressure range.

19 Claims, 9 Drawing Sheets

(51) Int. Cl.
*B01J 20/18* (2006.01)
*B01J 20/34* (2006.01)
*B01D 53/04* (2006.01)
B01D 53/44 (2006.01)
F04D 27/00 (2006.01)

(52) U.S. Cl.
CPC .. *B01D 2259/4009* (2013.01); *B01D 2259/41* (2013.01); *F04D 27/004* (2013.01)

(56) References Cited

U.S. PATENT DOCUMENTS

| | | | |
|---|---|---|---|
| 5,914,091 | A | 6/1999 | Hoist et al. |
| 5,967,771 | A | 10/1999 | Chen et al. |
| 8,628,608 | B2 | 1/2014 | Jensen et al. |
| 9,841,242 | B2* | 12/2017 | Zhang ............... F28D 19/04 |
| 2003/0139894 | A1* | 7/2003 | Ryan .................. G01K 17/12 |
| | | | 702/132 |
| 2005/0109207 | A1 | 5/2005 | Olander et al. |
| 2008/0166604 | A1* | 7/2008 | Weingaertner .... H01M 8/04992 |
| | | | 429/430 |
| 2011/0177408 | A1* | 7/2011 | Tsai .................. H01M 8/04305 |
| | | | 429/423 |
| 2014/0089055 | A1* | 3/2014 | Smith ................. H01M 8/0494 |
| | | | 705/7.36 |
| 2017/0012309 | A1* | 1/2017 | Venkat ............... H01M 8/0618 |

OTHER PUBLICATIONS

"Zeolite Rotor Concentrator Systems," Munters Corporation—Zeol Division, 2015, 5 pages.
"VOC Abatement for Semiconductor Fabrication," Munters Corporation—Zeal Division, 2008, 2 pages.

* cited by examiner

FLOW BALANCE CONTROL IN VOLATILE ORGANIC COMPOUND (VOC) ABATEMENT SYSTEMS

REFERENCE TO RELATED APPLICATION

This application claims the benefit of U.S. Provisional Patent Application No. 62/430,824, filed Dec. 6, 2016.

BACKGROUND OF THE INVENTION

1. Field of the Invention

Systems for manufacturing or other industrial processes often exhaust, as byproducts, particulates and fumes or exhaust vapors that may include gaseous air pollutants such as volatile organic compounds (VOCs). It is desirable for environmental and health reasons, and to comply with environmental laws, to remove the VOCs before exhausting the fumes to atmosphere. The present invention relates to the abatement of pollutants in industrial process gases and, in particular, to balancing system parameters before and during the abatement process in order to compensate for dynamic changes and maintain efficiency.

2. Related Background Art

Certain known VOC abatement systems utilize a rotary wheel that holds a medium for removal of the VOCs. One example of such a medium is zeolite. Zeolite is an inorganic crystal with properties suited to adsorbing VOCs. A simple zeolite rotor concentrator 10 is shown in FIG. 10. A rotor 12 holds sections 14 of zeolite as the adsorption medium. As rotor 12 rotates at a controlled speed, VOC-laden process air 16 is directed through a defined adsorption zone of the rotor and emerges as clean air 18 as the zeolite adsorbs and removes the VOCs. The clean air can then be safely discharged to atmosphere. Rotor 12 continues to rotate and zeolite sections 14 that had adsorbed VOCs are moved to a defined desorption or regeneration zone. In order to remove the VOCs adsorbed by the rotor medium, heated desorption air 20 is directed through the desorption zone of the rotor. The removed VOCs are carried in a concentrate airstream 22 away from the rotor for further processing. Thus, the rotor turns continuously so that the adsorbed VOCs are moved from the adsorption zone to the desorption zone where the VOCs are removed from the rotor, and the regenerated sector of the rotor then returns to the adsorption zone where the process air stream flows in a continuous process. The concentrate can be sent to an oxidizer and/or catalyst where the VOCs are converted to harmless compounds, such as water vapor and $CO_2$.

The zeolite rotor concentrator can be incorporated in a more complex abatement system that includes one or more media rotors and corresponding drive motors as well as various motor-driven fans.

SUMMARY OF THE INVENTION

The present invention can meet system regulatory goals while minimizing lifetime costs, energy consumption, and secondary pollutants.

The present invention can also ensure that only the energy required for proper performance is used when rebalancing, thus saving on energy (gas fuels and power).

In one aspect, the present invention relates to a method of controlling an apparatus that removes specified substances from a process gaseous stream, the apparatus using at least one fan and a rotary wheel that removes the specified substances, the method comprising measuring a pressure difference of the process gaseous stream across upstream and downstream sides of the rotary wheel; comparing the measured pressure difference to a predetermined pressure range; and controlling the at least one fan to increase or decrease its speed if the measured pressure difference is outside of the predetermined pressure range so as to change the pressure difference so as to be within the predetermined pressure range.

In another aspect, the invention relates to an apparatus for removing specified substances from a process gaseous stream, the apparatus comprising at least one fan; a rotary wheel that removes the specified substances from the process gaseous stream; a pressure sensor that measures a pressure difference of the process gaseous stream across upstream and downstream sides of the rotary wheel; and a processor that compares the measured pressure difference with a predetermined pressure range, and controls the at least one fan to increase or decrease its speed if the measured pressure difference is outside of the predetermined pressure range so as to change the pressure difference so as to be within the predetermined pressure range.

In yet another aspect, the present invention relates to a non-transitory, computer-readable medium executable by a computer for controlling an apparatus that removes specified substances from a process gaseous stream, the apparatus using at least one fan and a rotary wheel that removes the specified substances, the medium storing a program executed by the computer to measure a pressure difference of the process gaseous stream across upstream and downstream sides of the rotary wheel, compare the measured pressure difference to a predetermined pressure range, and control the at least one fan to increase or decrease its speed if the measured pressure difference is outside of the predetermined pressure range so as to change the pressure difference so as to be within the predetermined pressure range.

These and other aspects, objects, features, and advantages of the invention will become apparent from the following detailed description of illustrative embodiments thereof, which is to be read in connection with the accompanying drawings.

DETAILED DESCRIPTION OF THE PREFERRED EMBODIMENTS

Figure 1:
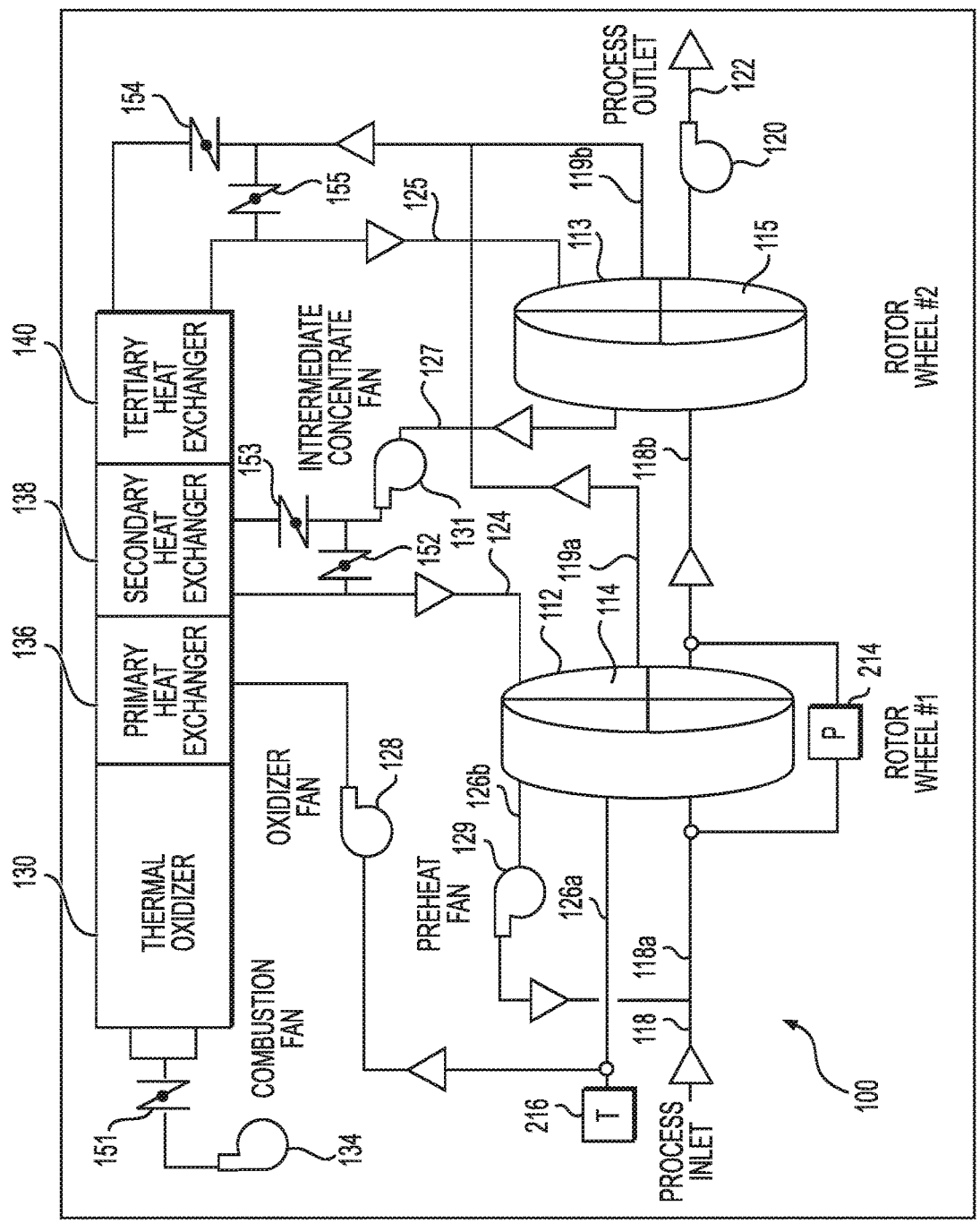
FIG. 1 shows a rotor concentrator system according to a first preferred embodiment of the invention incorporating two rotors.

FIG. 1 shows a rotor concentrator system 100 according to a first preferred embodiment of the invention that incorporates two pollutant-adsorbing rotors. The system is designed to remove undesired substances, such as VOCs, from process air. The process air can be from any target source where the air is required to be cleaned before being exhausted to the atmosphere. Industrial sources of such process air include semiconductor fabrication, paint manufacturing, spray paint finishing, and coating operations.

While the preferred embodiments specifically describe treating VOC-laden gases and removing the VOCs using zeolite, the present invention is not intended to be limited to specific pollutants or specific pollutant-removing compounds. The present invention is equally suitable to many environments and various pollutant-removing compounds.

In a preferred embodiment, the system includes two adsorbent rotors 112, 113 disposed in series and having sections of adsorbent medium 114, 115. In operation, VOC-laden process air is directed through the first rotor 112, which removes a portion of the VOCs, and then through the second rotor 113, which removes more of the VOCs, so as to increase the VOC removing effectiveness of the system. While two rotors are shown in this embodiment, a single rotor or more than two rotors can be used depending on system requirements. In a preferred embodiment, zeolite is used as the adsorbent medium. In the example shown, four sections of a zeolite medium are used for each rotor, but the invention is not to be limited to any particular number, and can even be one, that is, a single, monolithic section. The number of sections can be determined by the size of each rotor and the intended application. The size of the rotors is not intended to be limited and also can be determined by the intended application. Rotors on the order of 1-20 feet in diameter and 6 inches to two feet in thickness have been used, but such is not limiting. One preferred rotor is the Zeolite HoneyCombe™ rotor manufactured by Munters Corporation. Such rotors are formed from a corrugated mineral fiber substance treated with a form of zeolite and other inorganic materials.

Each of rotors 112, 113 is driven about its center axis by a rotor drive motor (not shown) via any suitable transmission system including any combination of gears and belts, or by direct drive. The rotor drive motors are of any know type that can be controlled to vary their speed, such as by any known speed controller (not shown). Each rotor drive motor is preferably of a variable frequency drive (VFD) type, in which the speed of the motor is controlled by the drive signal. Process air 118 (118a, 118b) from the industrial source or plant is drawn through unshown ductwork and an adsorption zone of each rotor 112, 113 by a process air fan or blower 120. Process air fan 120, as well as the other fans or blowers described hereinafter, can be of any known type having an integral or separate fan drive motor. The fans of the system are intended to be of variable speed and can be controlled by a main controller, to be described later. The fan motors are each connected to any known VFD, which receives control signals from the main controller. As process air fan 120 draws the solvent-laden process air through the adsorption zones of the rotors 112, 113 sequentially, VOCs are removed from the process airstream by adsorption onto the zeolite sections and the process air is cleaned and discharged via the process air fan 120 into the atmosphere as clean exhaust air 122. As the rotors 112, 113 further rotate, the sector of each rotor that had adsorbed the VOCs moves to a desorption or regeneration zone, where the VOCs are desorbed and passed to a VOC concentrate stream 126a, 126b, 127. Desorption takes place due to heated desorption airstreams 124, 125 that are directed to the desorption zones of the rotors 112, 113 via unshown ductwork by fans described below. The desorption airstreams 124, 125 are controlled to be approximately 5-10% of the flow volume of the process airstream 118.

The VOC concentrate airstream is typically sent to an oxidizer and/or catalyst to convert the VOCs into non-polluting constituents. In the shown embodiments, part of the VOC concentrate airstream 126a from the first rotor 112 is directed to oxidizer 130 by an oxidizer fan 128. Oxidizer 130 is provided with a heat source to supply heat to an oxidation chamber where the VOC concentrate stream 126a is directed. In the shown embodiment, the oxidation heat is generated by combustion, using any known combustion fuel, such as natural gas, and the combustion heat is directed to the oxidation chamber by a combustion fan 134. The amount of heat generated for oxidation can be controlled by metering the fuel supply and correspondingly varying the speed of the combustion fan 134. Oxidation of the VOC concentrate airstream takes place in the oxidation chamber where the combustion heat is directed. As an example, oxidation converts the VOCs into water vapor and $CO_2$.

For efficiency, it is preferable to utilize exhaust heat from the oxidizer 130 for other applications using serial heat exchangers. For example, heat energy from the oxidizer exhaust can be used to heat the VOC concentrate airstream 126b to a pre-oxidation temperature prior to entering the oxidizer. Further, exhaust heat from the oxidizer can be used to heat the desorption airstreams 124, 125 to the necessary temperature for desorbing the VOCs adsorbed by the zeolite in the rotors 112, 113. The heat exchangers can be of any known type, such as indirect shell and tube heat exchangers having internal coils or tubes. Primary heat exchanger 136 receives the VOC concentrate airstream 126a driven by oxidizer fan 128 prior to entry to the combustion chamber of the oxidizer 130. Secondary heat exchanger 138, disposed downstream of the primary heat exchanger 136 in the direction of oxidizer exhaust flow, receives the desorption airstream 127 driven by intermediate concentrate fan 131 from the second rotor 113. Tertiary heat exchanger 140, disposed downstream of the secondary heat exchanger 138 in the direction of oxidizer exhaust flow, receives a portion of cleaned process air 119a, 119b from the first and second rotors 112, 113, heats the air in its coils, and supplies the heated air as regeneration air 125 through the regeneration zone of the second rotor 113. The heat exchangers are preferably disposed within a unit that houses oxidizer 130. Unshown ductwork directs the flow of the various streams to the internal coils of the heat exchangers.

Heated exhaust including the converted water vapor and $CO_2$ from oxidizer 130 driven by combustion fan 134 is directed into the primary heat exchanger 136 to transfer heat to the VOC concentrate stream 126a that is driven by oxidizer fan 128 through coils in the primary heat exchanger so as to heat the VOC concentrate stream 126a to a pre-oxidation temperature before entering the combustion chamber of the oxidizer 130. The pre-oxidation temperature of the VOC concentrate stream 126a is preferred for efficient and effective oxidation. The heated exhaust from the oxidizer 130 that has been directed through the primary heat exchanger 136 then flows to the secondary heat exchanger 138. Regeneration airstream 125, which flows through the second rotor 113 to remove VOCs, forms an intermediate concentrate stream 127. Intermediate concentrate stream 127 is directed by intermediate concentrate fan 131 through coils in the secondary heat exchanger to raise its temperature for use as regeneration airstream 124. In a preferred embodiment, Cleaned portions 119a, 119b of the process air 118 that had been directed through the first and second rotors 112, 113 are directed through the coils of the tertiary heat exchanger 140 and then back through the regeneration or desorption zone of the second rotor 113. This raises the temperature of these portions of the adsorbed, cleaned air to the necessary temperature to remove the VOCs from the second rotor 113. The heated desorption air 125 is directed by unshown ductwork to the desorption zone of the second rotor 113. The cooled oxidizer exhaust that has travelled through the three sequential heat exchangers 136, 138, 140 then exits the tertiary heat exchanger 140 and can be safely exhausted to atmosphere as the VOCs have been converted to harmless constituents. If the heat from the oxidizer 130 is insufficient to raise the temperature of the VOC concentrate airstream 126a to the desired pre-oxidation temperature or to raise the temperatures of the desorption airstreams 124, 125 to the necessary desorption temperature, auxiliary heating sources may be used, but such may lower the efficiency of the system.

In operation, process air 118 is sequentially driven through the adsorption zones of rotors 112, 113 and VOCs or other pollutants are removed from the process air by the zeolite sections 114, 115 in the rotors 112, 113. The removed VOCs are then carried within the rotors 112, 113 to the rotor desorption zones where the desorption airstreams 124, 125 heated by the secondary and tertiary heat exchangers 138, 140, respectively, are driven to remove the VOCs from the zeolite and into the VOC concentrate streams 126, 127. A portion 126a of the VOC concentrate stream from the first rotor 112 is then driven by oxidizer fan 128 through the primary heat exchanger 136, where it is heated to the pre-oxidation temperature, and then to the combustion chamber of oxidizer 130, where the VOCs are oxidized and converted into water vapor and $CO_2$. Another portion 126b of the VOC concentrate stream from the first rotor 112 is driven by preheat fan 129 back into the process air stream and through the first, and then second, rotors 112, 113. This preheats the process airstream 118 so as to increase the efficiency of VOC capture by the zeolite. The process is continuous with the rotors 112, 113 rotating at a set speed, such as 2-8 revolutions per hour. In such a system, it is critical that the flow of the various gases be balanced, both for energy efficiency and effective VOC conversion. This means that any changes in the flow of the process air 118, for example by increasing or decreasing manufacturing output, must be countered with corresponding changes in the flow of the gases driven by the other fans. After calculating the optimum airflow through the various sections of the system, baffles 151-155 can be adjusted to establish balanced flow throughout the system. The system and method of the present invention are designed to maintain that balance throughout operation regardless of any changes in flow of the process air.

Figure 2:
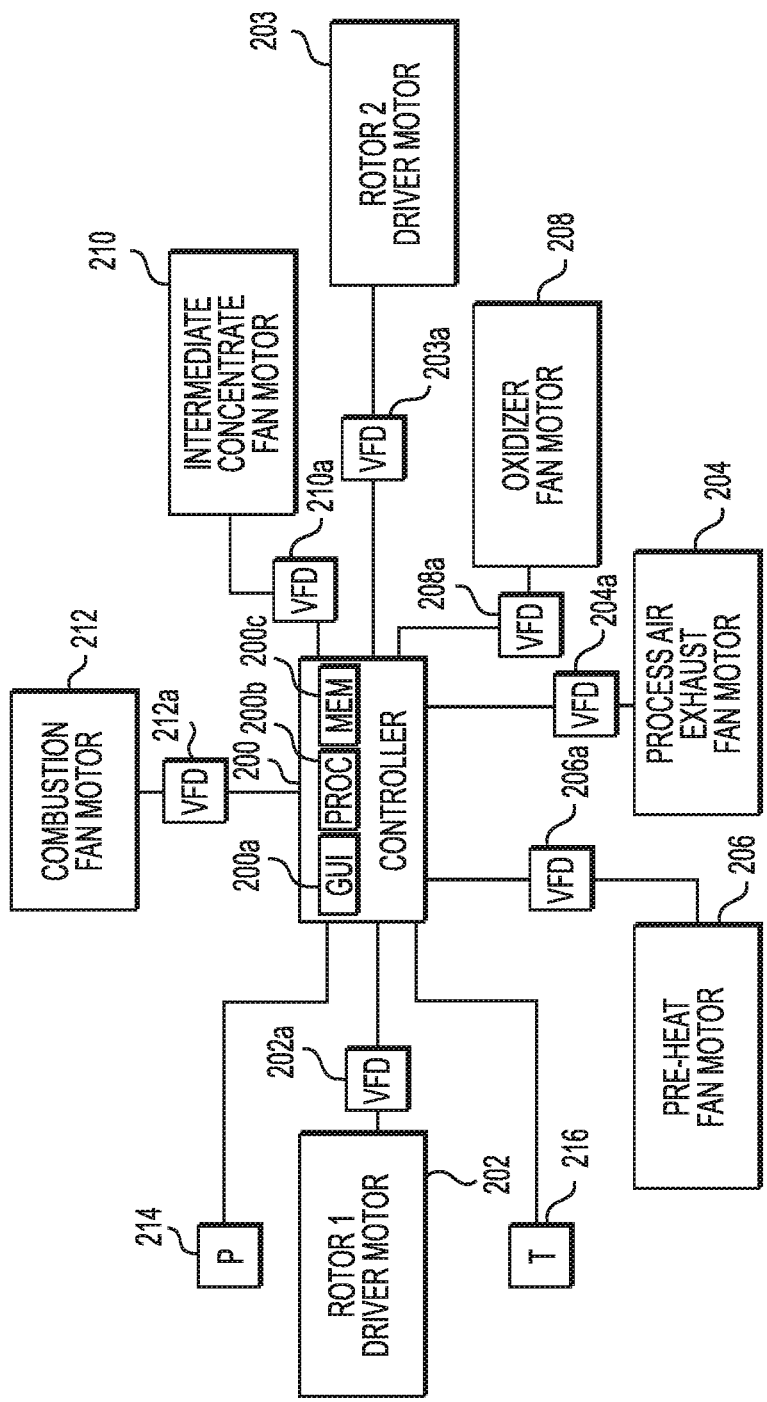
FIG. 2 is a schematic diagram showing control of the rotor concentrator system.

FIG. 2 is a schematic diagram showing control of the rotor concentrator system 100. The system utilizes a controller 200 to control the various processes and components. Controller 200 can be any known processor programmed to control the various components of the rotor concentrator system 100 and can be interfaced with a SCADA (supervisory control and data acquisition) system that controls the overall plant that generates the process gas, for example. The controller 200 can include an operator interface 200a for operator set up and control. As discussed above, the motors of the various fans and rotors are of variable speed and are preferably connected to variable frequency drives (VFDs) known to those of skill in the art.

The speed of the fans and rotor can be controlled by varying the control signals sent from the controller 200 to the VFDs 202a, 203a, 204a, 206a, 208a, 210a, 212a of the associated motors. By controlling the frequency of the drive signals and monitoring certain parameters, the system can be switched between high and low flow modes while balancing the flows of the various components and maintaining flow balance throughout operation. For example, the controller 200 sends DC milliamp current control signals to the VFDs, which convert the control signals to corresponding frequencies that are sent to the associated motors, with the resulting drive speed of the motors being proportional to the signal frequency.

Controller 200 is connected by control lines to the VFDs of motors for the system fans and rotors. These include a first rotor drive motor 202 for driving the first rotor 112, second rotor drive motor 203 for driving the second rotor 113, process air exhaust fan motor 204 for driving process air exhaust fan 120, pre-heat fan motor 206 for driving pre-heat fan 129, oxidizer fan motor 208 for driving oxidizer fan 128, intermediate concentrate fan motor 210 for driving intermediate concentrate fan 131, and combustion fan motor 212 for driving combustion fan 134. In addition, controller 200 receives feedback signals from various sensors in order to operate and balance the system. Among these sensors, primary control for operation and balancing is based on feedback from a differential pressure sensor 214 that senses the differential pressure across both sides of the first rotor 112 in the process airstream 118a. Secondary control is based on feedback from temperature sensor 216, which senses the temperature of the VOC concentrate stream 126a. These sensors can be any known sensors for measuring pressure and temperature, respectively.

The controller 200 of the VOC abatement system can run a rebalancing program to adjust the rotor and fan speeds to compensate for changes in the process inlet pressure or concentrate outlet temperature. As noted above, the primary control is based on the pressure differential across the first rotor 112 in the process airstream 118a as measured by pressure sensor 214. In the primary control, the system can operate under two adjustment levels. The first is based on a set of averaged differential pressure readings across the first rotor 112, and the second is a continuously monitored delta that will modify the speeds if a large pressure change is detected. The secondary control is based on the temperature at the VOC concentrate outlet from the first rotor 112 as measured by temperature sensor 216. In the secondary control, if the measured temperature is outside of an entered temperature limit, the speed of certain fans will be increased/decreased, but the rotor speed is not adjusted.

When the speeds are to be modified, the rate of change will be per a predetermined ramp control, for example, 1 Hz per every 20 seconds. That is, controller 200 will gradually increase the frequency of the drive signals supplied to the fan and rotor drive motor VFDs at a predetermined rate until the parameters are determined to be back within the set limits.

Figure 3:
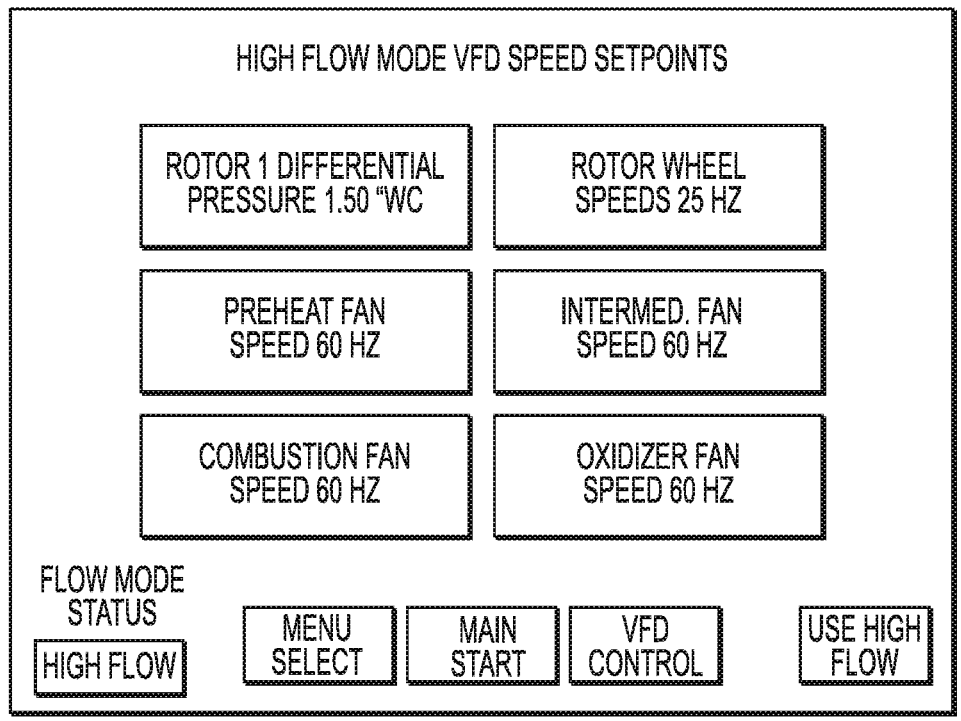
FIG. 3 depicts an operator interface for setting parameters in a High Flow mode.
Figure 4:
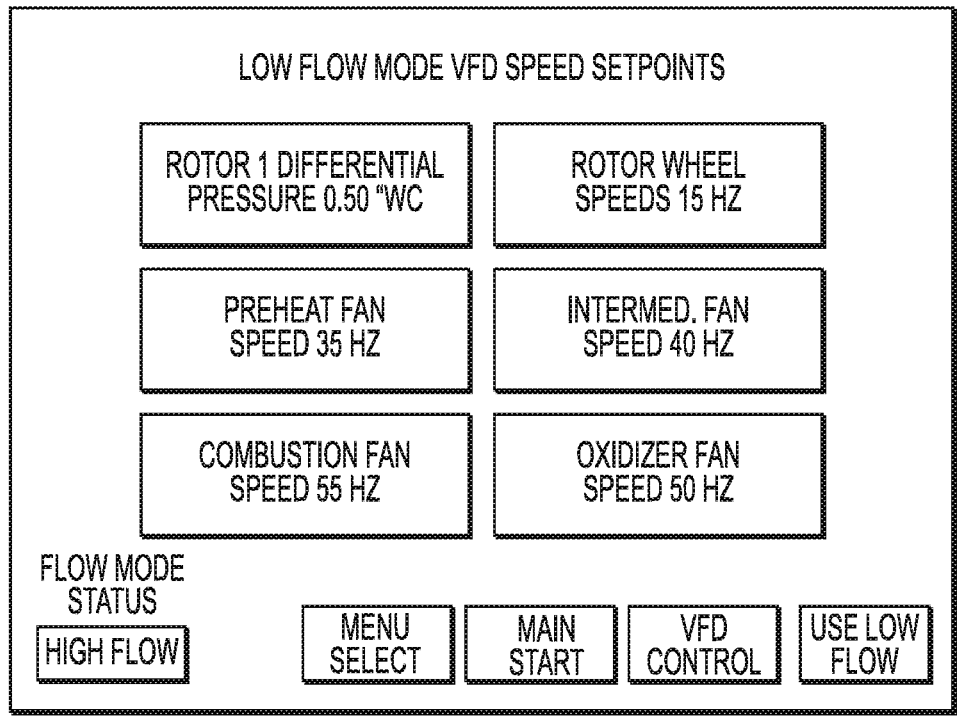
FIG. 4 depicts an operator interface for setting parameters in a Low Flow mode.
Figure 5:
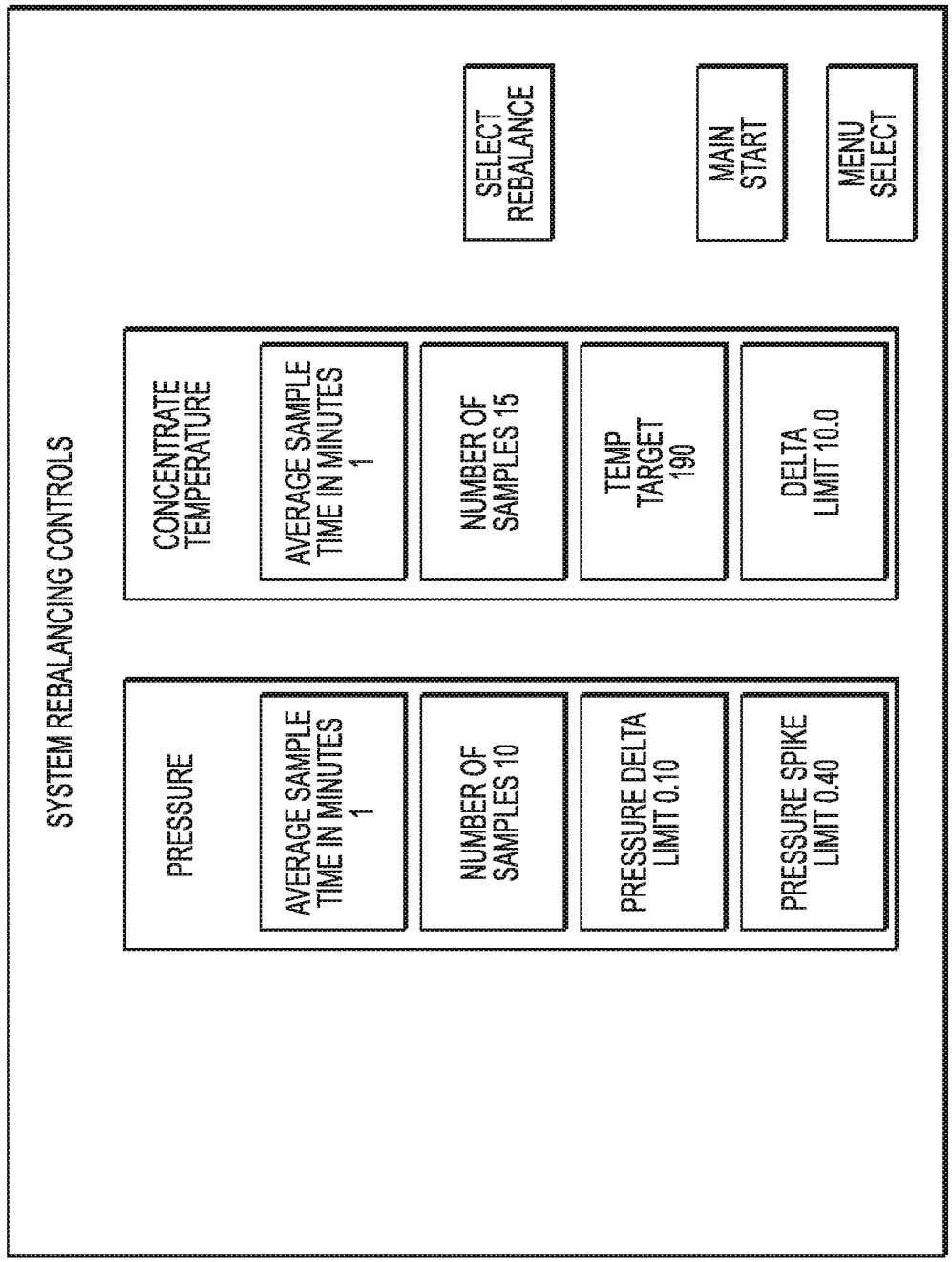
FIG. 5 depicts an operator interface for setting parameters in a Rebalancing mode.

At the operator interface 200a of controller 200, two mode set point screens, for High Flow and Low Flow modes, are provided, as shown in FIGS. 3 and 4. Calculated speeds for the rotors and fans can be entered by an operator on these screens. A set point for the differential pressure at the first rotor 112 is included in each screen. Preferably, the pressure to be entered is the calculated differential pressure across the first rotor 112 at these fans speeds. A further screen to control the rebalance mode is shown in FIG. 5.

The various set points to be entered through the operator interface 200a in the various modes, as well as the navigation buttons, are defined below.

Primary Control Set points—Pressure

Average Sample Time—Time in minutes between each pressure reading

Number of Samples—Number of pressure reading samples to be averaged

Pressure Delta Limit—A +/− limit of the averaged sample relative to the target pressure. Fan speeds only change if the averaged sample is outside of the pressure delta limit Pressure Spike Limit—A +/− limit of the current pressure relative to the target pressure. If current pressure goes outside of the pressure spike limit for a duration of, for example, one minute, as compared to the target pressure, the fan speeds will be adjusted. The pressure spike limit does not use the average sampled reading.

Secondary Control Set point—Concentrate Temperature

Average Sample Time—Time in minutes between each temperature reading

Number of Samples—Number of temperature reading samples to be averaged

Temp Set point—Target temperature

Delta Limit—A +/− limit of the entered Temperature Set point as compared to the average temperature.

Navigation Buttons

Select Rebalance—Selects the rebalancing mode. In a preferred embodiment, the rebalance mode will start automatically after initial startup. If the operator puts the unit in the High or Low Flow mode, this button can be used to select the rebalance mode Main Menu—Selects Main Menu Screen Main Start—Selects Main Startup screen Operation of both the primary and secondary control will be described in more detail below.

Primary Control

Figure 6:
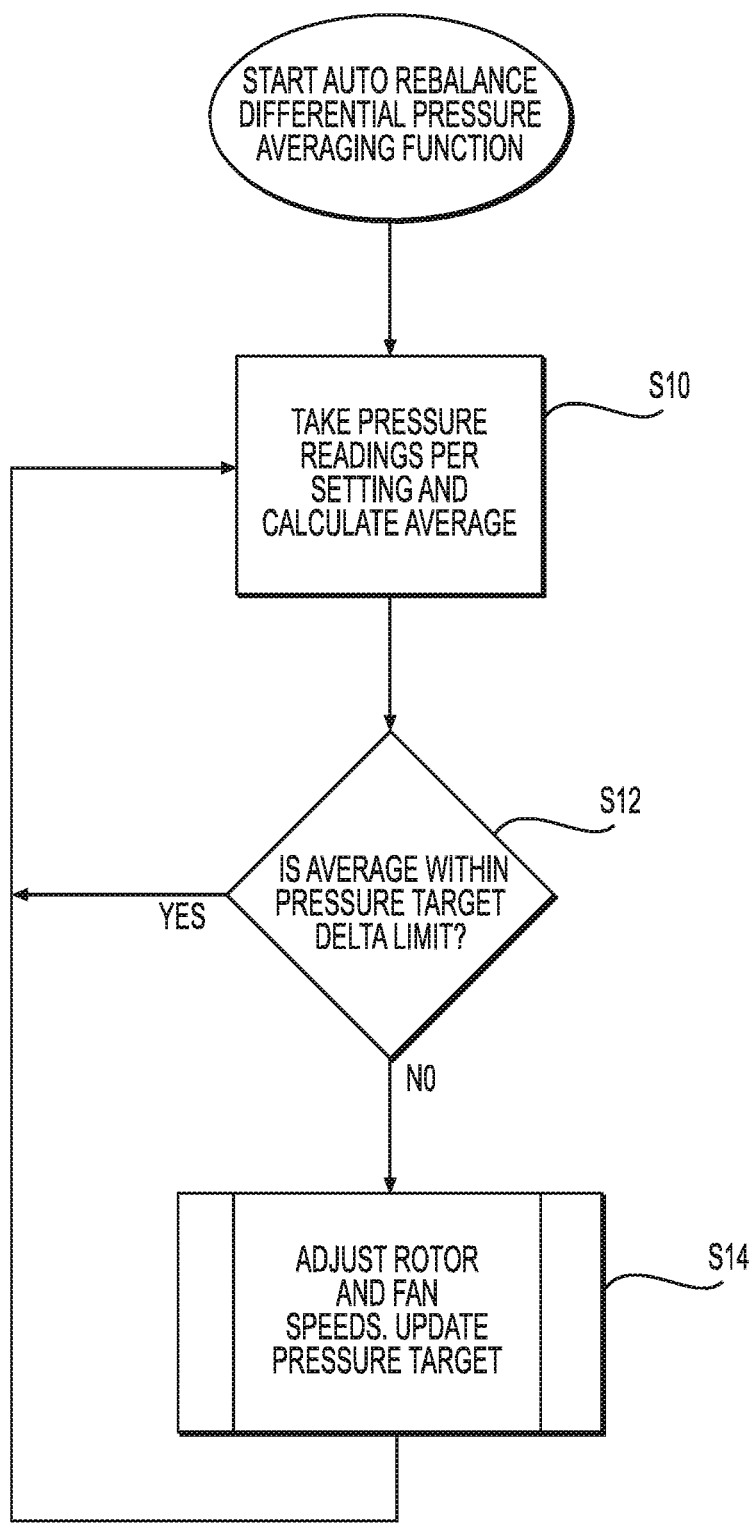
FIG. 6 is a flowchart depicting an example of a first aspect the primary system control based on pressure.

FIG. 6 is a flowchart depicting an example of the primary control. The monitored pressure in the primary control is based on averaged pressure readings measured by pressure sensor 214 across the first rotor 112 in the process airstream 118a in Step S10. The averaging control is based on two variables: the time between pressure samples and the number of pressure samples. In step S12, the averaged pressure is compared to the pressure settings input on the High and Low Flow screens. If the latest averaged reading is outside of the Delta Limit, as compared to the target pressure, the speeds of the fans and rotors will be modified accordingly by the controller 200 in step S14. The target pressure is the last averaged pressure before the fan speeds were instructed to be modified. If after an average pressure sample the pressure is outside of the delta, the fan speeds are adjusted and the target pressure is updated to the current average pressure. If the average pressure is within the delta limit, the fan speeds will not be adjusted and the target pressure will remain the same and the control will return to step S10 where the pressure readings are measured and averaged. With such a rebalancing operation, only the energy required for proper performance is used when rebalancing, thus saving on energy (gas fuels and power).

As a numerical example, if the averaged pressure reading is 50% between the two mode settings, then the controller 200 sets the rotor and fan speeds to 50% of their High and Low Flow settings. Using the settings shown above on the High and Low Flow screens, if the averaged pressure is 1.0 inches of water column ("WC), the rotor and fan speeds will be as shown in Table 1 below.

TABLE 1

| "WC | Rotor Speed Hz | Preheat Speed Hz | Intermediate Concentrate Speed Hz | Oxidizer Speed Hz | Combustion Speed Hz |
|---|---|---|---|---|---|
| 1.0 | 20 | 47 | 50 | 55 | 57 |

Figure 7:
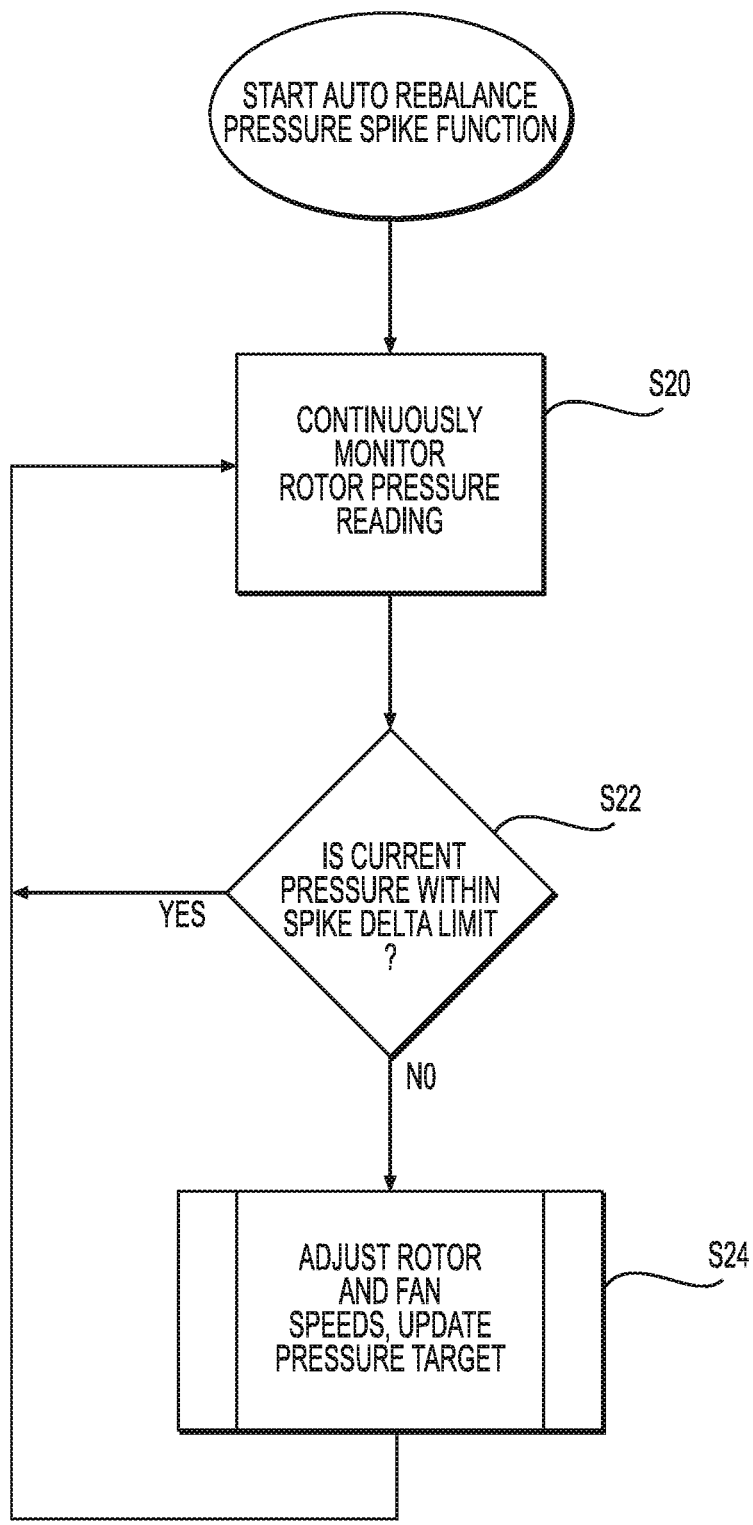
FIG. 7 is a flowchart depicting an example of a second aspect of the primary system control based on pressure.

The system speeds will also change if there is a large spike in the measured pressure without waiting for the averaged sample cycle to complete, as shown in the flowchart of FIG. 7. On the set point screen of FIG. 5, the "Pressure Spike Limit" is 0.04"WC. If the current pressure monitored in step S20 is determined in step S22 to rise or fall outside of the target pressure by +/− 0.04"WC and to remain there for 60 seconds, for example, the rotor and fan speeds will be adjusted in step S24 as described above. The 60 second time delay is to confirm the pressure has changed and stabilized and is not a short bump.

Secondary Control

Figure 8:
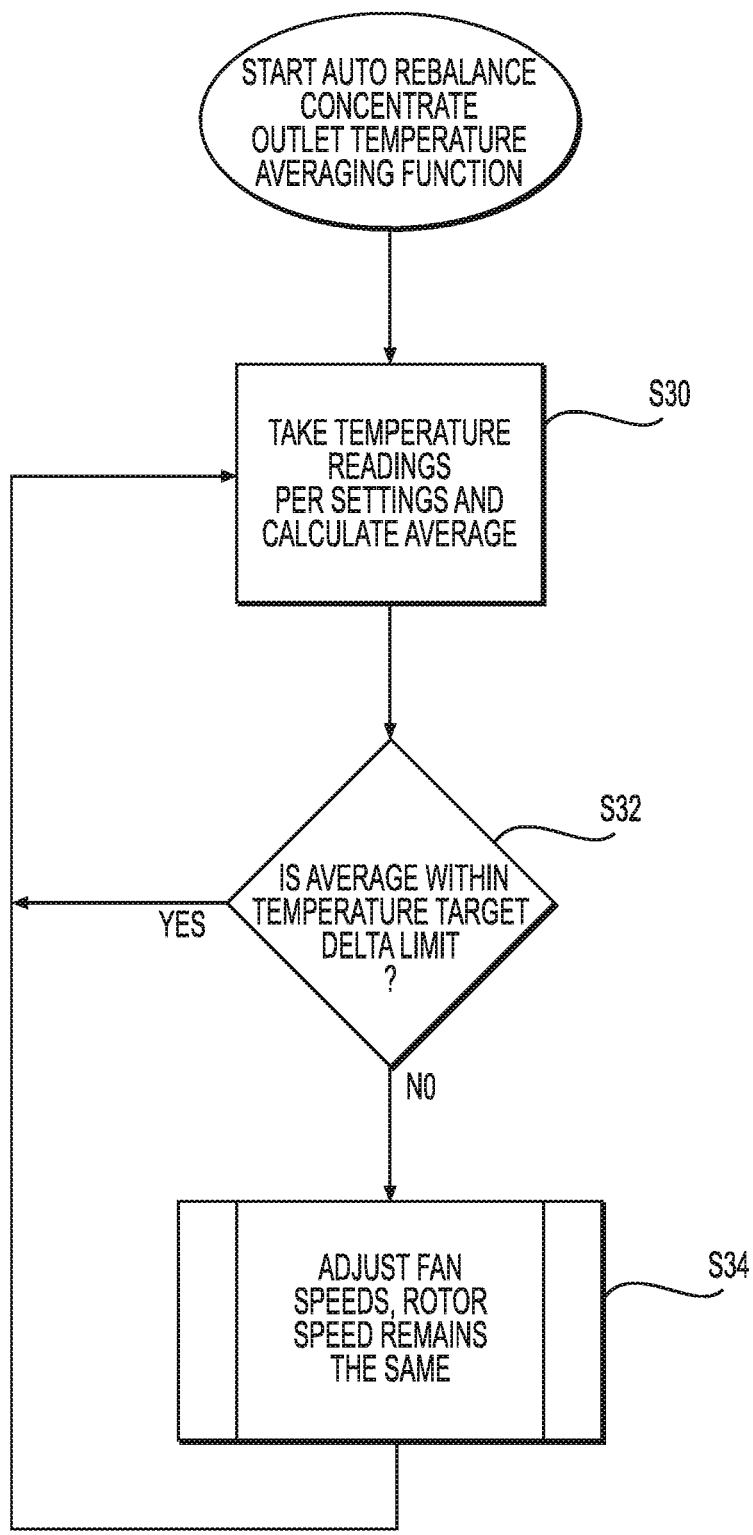
FIG. 8 is a flowchart depicting an example of the secondary system flow control based on concentrate temperature.

The secondary control of the fan speeds is based on the concentrate temperature, as shown in the flowchart of FIG. 8. The secondary temperature control functions similarly to the primary pressure control with the exception that the operator enters the target septpoint. In step S30, controller 200 monitors and samples the VOC concentrate stream outlet temperature using temperature sensor 216 to determine deviation from the required temperature. Because temperature changes are typically slower than pressure changes in the system, the averaged time for this point is preferably set to be longer than the target pressure sample time. In this manner, the two control variables, temperature and pressure, will not conflict with each other. If the average temperature is determined in step S32 to rise or fall outside of the set delta limit, a small, for example, 1 Hz, change to the oxidizer fan 128 is made in step S34. The controller 200 calculates what percentage 1 Hz is of the range of the oxidizer fan's High and Low Flow speeds. The other fans will then be adjusted by the same percentage of their High and Low Flow speeds. If the temperature is above the target set point, the fans are reduced in speed. If the temperature is below the target set point, the fans are increased in speed. The rotor speed will not change based on the measured VOC concentrate temperature. This allows more or less heat into the wheel to adjust the temperature back within the target limit. This process of sampling the temperatures and adjusting the fans will continue until the temperature is within the set tolerances. In the secondary temperature control, this offset from the pressure control speeds will remain until the next time the speeds are adjusted based on the flow pressure or rate of change pressure. Speeds will then be adjusted as described in the primary control without the offset. If the fan speeds are currently at the speeds as shown in Table 1 and referencing the High/Low set points as shown in FIGS. 3 and 4, 1 Hz of the oxidizer fan control is 10%. Therefore, the other fans will be adjusted to 10% of their High/Low set points as shown in Table 2 below. Note that the system sends integer values to the fans, so some speeds are rounded off and remain unchanged. If the temperature remains outside of the limit, the controller 200 controls the oxidizer fan to increase to 30%, for example, and then the other fans speeds will be modified to 30%.

TABLE 2

| "WC | Rotor Speed Hz | Preheat Speed Hz | Intermediate Concentrate Speed Hz | Oxidizer Speed Hz | Combustion Speed Hz |
|---|---|---|---|---|---|
| 1.0 | 20 | 47 | 50 | 56 | 57 |

Pressure and Temperature Device Warnings

The sensors for rotor differential pressure 214 and concentrate outlet temperature 216 are intended for use in system rebalancing, but can have additional utility. If either sensor fails, or there is otherwise a loss of input signal to the controller 200, a warning can be displayed on the operator interface 200a and the system will be automatically be switched to the High Flow mode. Preferably, these are warnings and not system shutdown faults.

Sequence of Operations

A preferred example of the sequence of operations for the system is described below.

Prior to setting up the rotor concentrator system 100, optimal pressures at the various flow points are determined by engineering calculations. Based on these calculations, all of the system fans are run at their full speed, e.g., at 60 Hz control, then the system is balanced to the calculated pressures at the various points by adjusting dampers 151-155. After balancing at high speed, the system is switched to low speed and rebalanced by varying the speeds of the fans without adjusting the dampers.

At startup, controller 200 controls the system to go to the High Flow mode. When the system switches to Online, the controller 200 then switches to the Rebalancing mode as described above. The pressure across the rotor 112 will be sampled for five minutes at 15 second intervals. This allows the flow to stabilize and is the initial target pressure. At the end of the five minute sample time, the rotor and fan speeds will be adjusted from the High Flow settings to the speeds as described above for the primary pressure control. As the averaged pressure changes per either Delta Limit or Spike Limit the speeds will change to the same relative percentage as the average pressure percentage. The High or Low Flow mode can still be selected by controlling relays via the SCADA system of the plant. If no relay is activated, the controller sets the system to the Rebalancing mode. The relays must be deactivated at start up for the system to switch to the rebalancing mode after going online.

In the foregoing embodiment, two rotors and four specific fans in the system are controlled to balance the gas flow upon a change in flow of process air. However, the invention is not intended to be limited to the type or number of fans described in the disclosed embodiment. More or fewer fans and rotors, and fans performing different functions from those described can be used as long as such is deemed to satisfy the overall scope of the invention. A description of a rotor concentrator system using a single rotor as a second embodiment of the invention follows.

Figure 9:
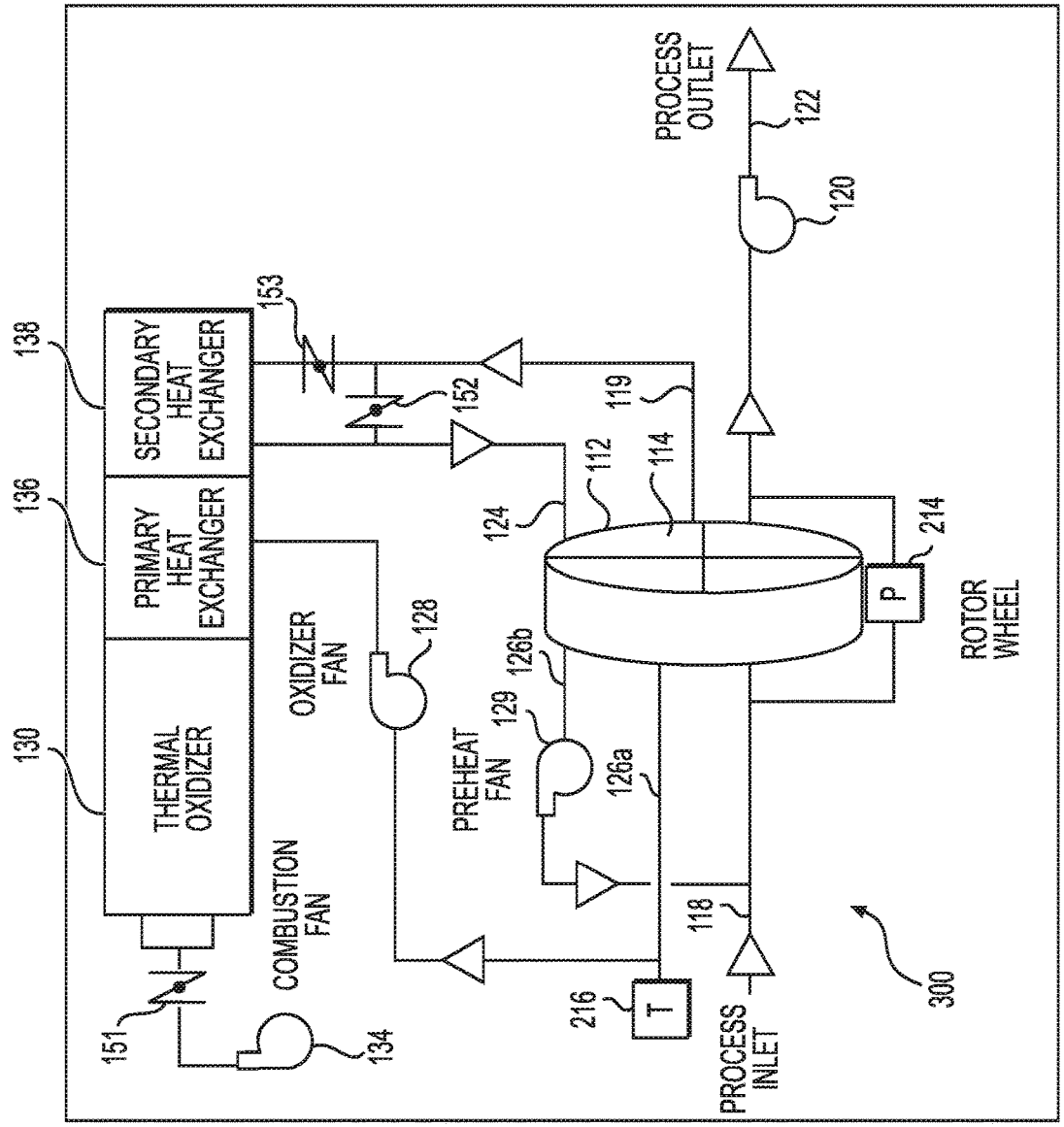
FIG. 9 shows a rotor concentrator system according to a second preferred embodiment of the invention incorporating a single rotor.
Figure 10:
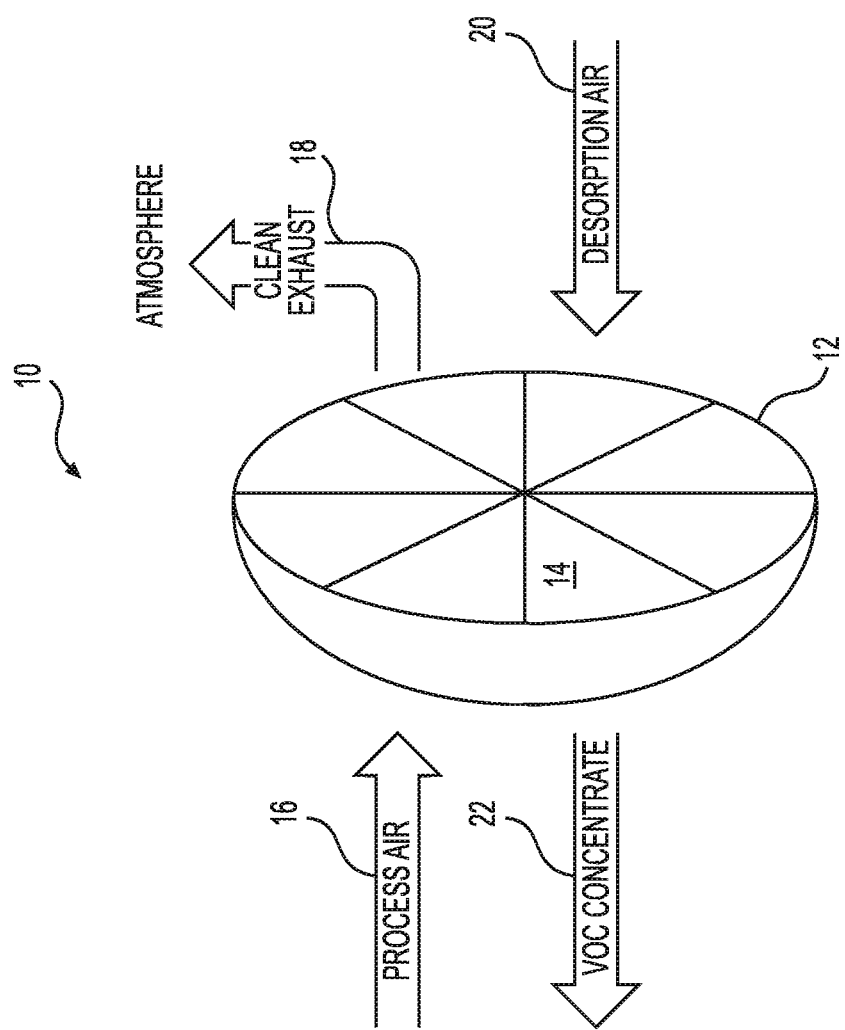
FIG. 10 shows a known zeolite rotor concentrator.

FIG. 9 shows a rotor concentrator system 300 according to a second preferred embodiment of the invention. Many of the components in the second embodiment are similar to corresponding components in the first embodiment and in those instances identical reference numerals will be used. Rotor concentrator system 300 of the second embodiment primarily differs from the first embodiment in that it incorporates a single pollutant-adsorbing rotor 112, rather than two rotors. As such, there is no need for an intermediate concentrate fan or a tertiary heat exchanger. Similarly to the first embodiment, system 300 uses primary and secondary controls to adjust rotor and fan speeds to dynamically balance the system. In particular, in the primary control the pressure differential across the single rotor 112 measured by pressure sensor 214 is used to adjust the rotor 112 speed and the speed of the oxidizer fan 128, preheat fan 129, and combustion fan 134. As in the first embodiment, both average pressure and spike pressure thresholds can be used to determine whether to initiate motor adjustment. The secondary control is based on the temperature of the concentrate stream 126a from the rotor. In the secondary control, the speed of the rotor is not adjusted. In other aspects, such as setting up the system, the second embodiment operates similarly to the first embodiment.

In the described embodiments, the controller 200 is a microprocessor-based controller that includes a processor 200b for performing various functions discussed above and a memory 200c for storing various data. The controller 200 may also be referred to as a CPU. In one embodiment, the control of the system 100 may be implemented by way of a series of instructions stored in the memory 200c and executed by the processor 200b. The controller 200 is communicatively coupled to an input device, which in this embodiment, includes a display screen on operator interface 200a. While the embodiment describes a touch screen suitable for receiving input from an operator, in addition to or instead of a touch (display) screen, the controller 200 may include other suitable input devices such as static buttons or a keyboard and mouse, for example.

Further, one aspect of the present invention includes providing a storage medium such as memory 200c that stores program codes for performing the aforesaid processes in the system or apparatus, reading the program codes with a computer (e.g., the CPU or MPU of controller 200) of the system or apparatus from the storage medium, then executing the program. In this case, the program codes read from the storage medium realize the functions according to the embodiments, and the storage medium storing the program codes constitutes the invention. The storage medium can be a hard disk, an optical disk, a magneto-optical disk, CD-ROM, CD-R, a magnetic tape, a non-volatile type memory card, or ROM, for example, and can be used to provide the program codes. The present invention includes a case where an OS (operating system) or the like working on the computer performs a part or entire processes in accordance with designations of the program codes and can realizes functions according to the above embodiments. The present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments Although this invention has been described in certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of controlling an apparatus that removes specified substances from a flowing process gaseous stream, the apparatus using at least one fan and a rotary wheel configured to remove the specified substances as the flowing process gaseous stream passes through the rotary wheel in a direction of flow, the method comprising:
measuring a pressure difference of the process gaseous stream across upstream and downstream sides of the rotary wheel with respect to the direction of flow;
comparing the measured pressure difference to a predetermined pressure range; and
controlling the at least one fan to increase or decrease its speed in response to determining that the measured pressure difference is outside of the predetermined pressure range so as to change the pressure difference so as to be within the predetermined pressure range.

2. The method according to claim 1, further comprising sampling plural differential pressure readings measured at predetermined time intervals, calculating an average of the plural differential pressure readings as an average pressure difference, and using the average pressure difference as the measured pressure difference in comparison with the predetermined pressure range.

3. The method according to claim 2, further comprising comparing each of the plural differential pressure readings to a spike threshold and controlling the at least one fan to increase its speed in response to determining that the differential pressure reading is above the spike threshold for at least a predetermined time period, regardless of whether the average pressure difference is within the predetermined pressure range.

4. The method according to claim 1, further comprising capturing the specified substances with the rotary wheel and removing the captured specified substances from the rotary wheel in a concentrate stream, which is directed to an oxidizer having a heat source, heat from the heat source being directed to at least one heat exchanger, wherein the at least one fan is at least one of an oxidizer fan for directing the concentrate stream to the oxidizer, a preheat fan for directing a portion of the concentrate stream to the process gaseous stream upstream of the rotary wheel, and a combustion fan for supplying air to the heat source.

5. The method according to claim 4, wherein the apparatus further uses a second rotary wheel downstream of the rotary wheel with respect to the direction of flow of the process gaseous stream, and at least one fan further includes an intermediate concentrate fan for directing a second concentrate stream from the second rotary wheel through another heat exchanger and to the rotary wheel as a gaseous regenerative stream, and each of the at least one fan is controlled to increase or decrease its speeds correspondingly in response to determining that the measured pressure difference is outside of the predetermined pressure range.

6. The method according to claim 1, further comprising removing the specified substance accumulated in the rotary wheel as a concentrate in a concentrate stream and measuring a temperature of the concentrate stream, comparing the measured temperature to a predetermined temperature range, and controlling the at least one fan to increase or decrease its speed in response to determining that the measured temperature is outside of the predetermined temperature range.

7. The method according to claim 1, further comprising controlling the speed of the rotary wheel to increase or decrease its speed in response to determining that the measured pressure difference is outside of the predetermined pressure range.

8. The method according to claim 1, wherein the rotary wheel contains zeolite to adsorb the specified substances from the process gaseous stream.

9. The method according to claim 1, further comprising controlling the rotary wheel to increase or decrease its speed correspondingly to the at least one fan in response to determining that the measured pressure difference is outside of the predetermined pressure range.

10. An apparatus for removing specified substances from a flowing process gaseous stream, the apparatus comprising:
at least one fan;
a rotary wheel configured to remove the specified substances from the flowing process gaseous stream as the process gaseous stream passes through the rotary wheel in a direction of flow;
a pressure sensor configured to measure a pressure difference of the process gaseous stream across upstream and downstream sides of the rotary wheel with respect to the direction of flow; and
a processor configured to compare the measured pressure difference with a predetermined pressure range, and control the at least one fan to increase or decrease its speed in response to determining that the measured pressure difference is outside of the predetermined pressure range so as to change the pressure difference so as to be within the predetermined pressure range.

11. The apparatus according to claim 10, wherein the processor is configured to sample plural differential pressure readings measured by the pressure sensor at predetermined time intervals, calculate an average of the plural differential pressure readings as an average pressure difference, and use the average pressure difference as the measured pressure difference for comparison with the predetermined pressure range.

12. The apparatus according to claim 11, wherein the processor is further configured to compare each of the plural differential pressure readings to a spike threshold and control the at least one fan to increase its speed in response to determining that the differential pressure reading is above the spike threshold for at least a predetermined time period, regardless of whether the average pressure difference is within the predetermined pressure range.

13. The apparatus according to claim 10, further comprising an oxidizer, at least one heat exchanger, and means for passing another gaseous stream through the rotary wheel to remove the specified substances that have been captured by the rotary wheel from the rotary wheel in a concentrate stream, the concentrate stream flowing to the oxidizer having a heat source, heat from the heat source being directed to the at least one heat exchanger, wherein the at least one fan is at least one of an oxidizer fan for directing the concentrate stream to the oxidizer, a preheat fan for directing a portion of the concentrate stream to the process gaseous stream upstream of the rotary wheel, and a combustion fan for supplying air to the heat source.

14. The apparatus according to claim 13, further comprising a second rotary wheel downstream of the rotary wheel with respect to the direction of flow of the process gaseous stream, and the at least one fan further includes an intermediate concentrate fan for directing a second concentrate stream from the second rotary wheel through another heat exchanger and to the rotary wheel as a gaseous regenerative stream, and each of the at least one fan is controlled to increase or decrease its speeds correspondingly in response to determining that the measured pressure difference is outside of the predetermined pressure range.

15. The apparatus according to claim 10, further comprising a concentrate fan configured to direct a gaseous stream through the rotary wheel to remove the specified substance accumulated in the rotary wheel as a concentrate in a concentrate stream and a temperature sensor configured to measure a temperature of the concentrate stream, wherein the processor is configured to compare the measured temperature to a predetermined temperature range, and control the at least one fan to increase or decrease its speed in response to determining that the measured temperature is outside of the predetermined temperature range.

16. The apparatus according to claim 10, wherein the processor is further configured to control the speed of the rotary wheel to increase or decrease its speed in response to determining that the measured pressure difference is outside of the predetermined pressure range.

17. The apparatus according to claim 10, wherein the rotary wheel contains zeolite to adsorb the specified substances from the process gaseous stream.

18. The apparatus according to claim 10, wherein the processor is further configured to control the rotary wheel to increase or decrease its speed correspondingly to the at least one fan in response to determining that the measured pressure difference is outside of the predetermined pressure range.

19. A non-transitory, computer-readable medium executable by a computer for controlling an apparatus that removes specified substances from a flowing process gaseous stream, the apparatus using at least one fan and a rotary wheel configured to remove the specified substances as the flowing process gaseous stream passes through the rotary wheel in a direction of flow, the medium storing a program executed by the computer to:
  measure a pressure difference of the process gaseous stream across upstream and downstream sides of the rotary wheel with respect to the direction of flow;
  compare the measured pressure difference to a predetermined pressure range; and
  control the at least one fan to increase or decrease its speed in response to determining that the measured pressure difference is outside of the predetermined pressure range so as to change the pressure difference so as to be within the predetermined pressure range.

* * * * *